US006277513B1

(12) United States Patent
Swathirajan et al.

(10) Patent No.: US 6,277,513 B1
(45) Date of Patent: *Aug. 21, 2001

(54) LAYERED ELECTRODE FOR ELECTROCHEMICAL CELLS

(75) Inventors: Swathy Swathirajan, West Bloomfield; Youssef M. Mikhail, Sterling Heights, both of MI (US)

(73) Assignee: General Motors Corporation, Detroit, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,206

(22) Filed: Apr. 12, 1999

(51) Int. Cl.[7] .................................................... H01M 4/02

(52) U.S. Cl. ............................... 429/44; 429/40; 429/41; 429/42; 29/746

(58) Field of Search ................................ 429/40, 41, 42, 429/44; 29/746

(56) References Cited

U.S. PATENT DOCUMENTS

| | | | |
|---|---|---|---|
| 4,362,790 | 12/1982 | Blanchart et al. | 429/42 |
| 4,876,115 | 10/1989 | Raistrick | 427/115 |
| 5,211,984 | 5/1993 | Wilson | 427/115 |
| 5,234,777 | 8/1993 | Wilson | 429/33 |
| 5,272,017 | 12/1993 | Swathirajan et al. | 429/33 |
| 5,316,871 | 5/1994 | Swathirajan et al. | 429/33 |
| 5,350,643 | * 9/1994 | Imahashi et al. | 429/41 |
| 5,431,800 | 7/1995 | Kirchhoff et al. | 204/290 R |
| 5,561,000 | * 10/1996 | Dirven et al. | 429/42 |
| 5,882,810 | * 3/1999 | Mussell et al. | 429/41 |
| 6,017,650 | * 1/2000 | Ramunni et al. | 429/44 |

FOREIGN PATENT DOCUMENTS

| | | |
|---|---|---|
| 0569062A2 | 11/1993 | (EP) . |
| 0569062A3 | 11/1993 | (EP) . |
| 0872906A1 | 10/1998 | (EP) . |

OTHER PUBLICATIONS

M.K. Debe and R.J. Poirier, "Postdeposition Growth of a Uniquely Nanostructured Organic Film by Vacuum Annealing", *J. Vac. Sci. Technol. A 12(4)*, Jul./Aug. 1994, pp 2017–2021.

M.K. Debe and A.R. Drube, "Structural Characteristics of a Uniquely Nanostructured Organic Thin Film", *J. Vac. Sci. Technol. B 13(3)*, May/Jun. 1995, pp. 1236–1240.

Mahlon S. Wilson and Shimshon Gottesfeld, "High Performance Catalyszed Membranes of Ultra–Low Pt Loadings for Polymer Electrolyte Fuel Cells", *J. Electrochem. Soc.*, vol. 139, No. 2, Feb. 1992, pp. L28–L30.

S. Swathirajan and Y.M. Mikail, "Evaluation of Ultralow Platinum Loaded Electrodes in PEM Fuel Cell at Ambient Conditions", Proceedings of the Symposium on Electrode Materials and Processes for Energy Conversion and Storage, Energy Technology, Battery, Physical Electrochemistry, and High Temperature Materials Divisions, Proceedings vol. 94–23, pp 158–172, No Month/Year Available.

Renaut Mosdale, Nasanobu Wakizoe, and Supremaniam Srinivasan, "Fabrication of Electrodes for Proton Exchange Membrane Fuel Cells Using a Spraying Method and Their Performance Evaluation", Proceedings of the Symposium of Electrode Material and Processes for Energy Conversion and Storage, Energy Technology, Battery, Physical Electrochemistry, and High Temperature Materials Divisions, Proceedings vol. 94–23, pp 179–189, No Month/Year Available.

(List continued on next page.)

*Primary Examiner*—Bruce F. Bell
(74) *Attorney, Agent, or Firm*—Lawrence B. Plant

(57) ABSTRACT

There is provided an electrode structure comprising a current collector sheet and first and second layers of electrode material. Together, the layers improve catalyst utilization and water management.

20 Claims, 12 Drawing Sheets

OTHER PUBLICATIONS

E.J. Taylor, E.B. Anderson, and N.R.K. Valambi, "Preparation of High–Platinum–Utilization Gas Diffusion Electrodes for Proton–Exchange–Membrane Fuel Cells", *J. Electrochem. Soc.,* vol. 139, No. 5, May 1992.

R. Mosdale and P. Stevens, "New Electrodes for Hydrogen/Oxygen Solid Polymer Electrolyte Fuel Cells", *Solid State Ionics* 61 (1993) pp 251–255, No Month Available.

Minoru Mizuhata, Kazuaki Yasuda, Keisuke Oguro, and Hiroyasu Takenaka, "Preparation of Gas Diffusion Electrode with Highly–Active Catalyst for PEFCs", *Electrochemical Society Proceedings,* vol. 95–23, pp 24–33, No Month/Year Available.

A.K. Shukla, P. Stevens, A Hamnett, and J.B. Goodenough, "A Nafion®–Bound Platinized Carbon Electrode for Oxygen Reduction in Solid Polymer Electrolyte Cells", *Journal of Applied Electrochemistry* 19 (1989), pp 383–386, No Month Available.

Makoto Uchida, Yuko–Aoyama, Nobuo Eda, and Akira Ohta, "New Preparation Method for Polymer–Electrolyte Fuel Cells", *J. Electrochem. Soc.,* vol. 142, No. 2, Feb. 1995, pp 463–468.

Patent Abstracts of Japan Publication No. 58004270, Jan. 11, 1983; Hitachi Maxell Ltd.

Lee et al., "Effects of Nafion Impregnation on Performances of PEMFC Electrodes," *Electrochimica Acta.,* vol. 43, No. 24, pp. 3693–3701, 1998. No month available.

Giorgi et al., "Influence of the PTFE Content in the Diffusion Layer of Low–Pt Loading Electrodes for Polymer Electrolyte Fuel Cells," *Electrochimica Acta*, vol. 43, No. 24, pp. 3675–3680, 1998. No month available.

European Search Report dated Jul. 26, 2000 for application No. EP 00101596.

\* cited by examiner

LAYERED ELECTRODE FOR ELECTROCHEMICAL CELLS

GOVERNMENT RIGHTS

The Government of the United States of America has the rights in this invention pursuant to Contract No. DE-AC02-90CH10435 awarded by the U.S. Department of Energy.

FIELD OF THE INVENTION

This invention relates to electrodes for use in electrochemical cells.

BACKGROUND OF THE INVENTION

Electrochemical cells are desirable for various applications, particularly when operated as fuel cells. Fuel cells have been proposed for many applications including electrical vehicular power plants to replace internal combustion engines. One fuel cell design uses a solid polymer electrolyte (SPE) membrane or proton exchange membrane (PEM), to provide ion exchange between the cathode and anode. Gaseous and liquid fuels are useable within fuel cells. Examples include hydrogen and methanol, and hydrogen is favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. A typical fuel cell is described in U.S. Pat. No. 5,272,017 and U.S. Pat. No. 5,316,871 (Swathirajan et al.).

Important aspects of a fuel cell include reaction surfaces where electrochemical reactions take place, catalysts which catalyze such reaction, ion conductive media, and mass transport media. The cost of power produced by a fuel cell is in part dependent on the cost of the catalyst. The cost of power produced by a fuel cell is significantly greater than competitive power generation alternatives, partly because of relatively poor utilization of precious metal catalysts in conventional electrodes. However, power produced from hydrogen-based fuel cells is desirable because hydrogen is environmentally acceptable and hydrogen fuel cells are efficient. Therefore, it is desirable to improve the catalyst utilization in fuel cell assemblies to render fuel cells more attractive for power generation. It is also desirable to improve reactant gas diffusion and movement of product water in the fuel cell.

SUMMARY OF THE INVENTION

In one aspect there is provided an electrode structure comprising a current collector sheet, a first electrode layer, and a second electrode layer. The first electrode layer is between the current collector sheet and the second electrode layer. The first layer comprises a first group of carbon particles and the second layer comprises a second group of carbon particles. The first layer is uncatalyzed or catalyzed with a first group of very finely divided catalytic particles; and the second layer is catalyzed with a second group of very finely divided catalytic particles. The weight ratio of catalytic particles to carbon particles of the first layer is less than that of the second layer.

In one embodiment, each one of the carbon particle groups comprises a plurality of the carbon particles having internal and external surfaces defining a plethora of pores within and between the carbon particles. The very finely divided catalytic particles are supported on the internal and the external surfaces of the carbon particles.

In another embodiment, the first layer is uncatalyzed and the second layer comprises the carbon particles having very finely divided catalytic particles supported on the internal and the external surfaces of the carbon particles.

Preferably, the first group of carbon particles is characterized by a density of 0.1 grams per cubic centimeter or less, corresponding to a volume per gram of at least 10 cubic centimeters per gram. Desirably, the second group of carbon particles is characterized by a pH which is in a range of about 6 to about 9. Preferably, each one of the carbon particle groups is characterized by a pH which is in a range of about 6 to about 9. Desirably, the second group of carbon particles is characterized by an average pore radius which is greater than 5 nanometers. Each one of the layers further comprises a proton conductive material intermingled with the carbon particles and the catalytic particles.

Desirably, the catalytic particle loading of the second layer is less than about 0.30 mg per $cm^2$ of electrode surface area. The catalytic loading of the first layer is less than that of the second layer, desirably is on the order of up to about 0.15 mg/$cm^2$, and preferably is on the order of up to about 0.02 mg/$cm^2$.

In one aspect, the second layer comprises catalytic particles and carbon particles in a weight ratio of about 20:80. The proton conductive material constitutes 30 to 35 percent by weight of said second layer, and catalytic and carbon particles constitute the balance.

In one embodiment there is provided a method of making the improved electrode structure described above for use in an electrochemical cell. The first layer of the electrode is produced by forming a mixture comprising proton-conductive material, a first group of carbon particles, and optimally catalytic particles. The mixture is applied to a current collector sheet to form a film. The second layer of the electrode is produced by forming a second layer over the first layer, where said second layer comprises proton-conductive material, a second group of carbon particles, and catalytic particles. The amount by weight of catalytic particles relative to carbon particles of the second layer is greater than that of the first layer. This method produces an electrode having significantly increased catalyst utilization, dramatic reduction of catalyst loading, and which is consequently less expensive to produce than electrodes produced by prior art methods.

There is also provided a method of making a combination electrolyte and electrode structure for an electrochemical cell having an electrolyte membrane of solid polymer proton-conductive material and first and second electrodes disposed on either side of the electrolyte membrane. At least one of the electrodes is formed by the method of the invention described above. The electrode produced in this method is then placed on a first surface of the electrolyte membrane such that the second layer faces the membrane. A second electrode is placed on the opposite surface of the membrane and the resulting structure is heated and compressed to adhere the electrodes to the membrane. In a preferred embodiment of the invention method the electrodes are adhered to the membrane by subjecting the assembly to a compressive load and an elevated temperature to result in some of the particles becoming at least partially embedded in the membrane, thereby providing a continuous path for protons to the catalyst site where reaction occurs.

The first and second groups of carbon particles are the same or different. That is, they may have the same characteristics or differ in at least one characteristic. In the case where both layers are catalyzed, the catalyst of the respective layers may be the same or different.

As can be seen from the description of the electrode, membrane electrode assembly, and the fuel cell system described above, the invention provides improved catalyst utilization and improved water management.

It is an object of the invention to provide new electrodes and new membrane electrode assemblies. Another object is to provide a method for preparing the electrodes and assemblies containing the improved electrodes. Advantageously, the membrane/electrode assembly of the invention provides relatively high power output with unexpectedly low catalyst loading.

These and other objects, features and advantages will become apparent from the following description of the preferred embodiments, claims, and accompanying drawings.

DETAILED DESCRIPTION OF THE PREFERRED EMBODIMENTS

In one aspect there is provided an electrode structure comprising a current collector sheet and first and second layers of electrode material. Together, the layers improve catalyst utilization and water management. This layered arrangement is particularly useful as a cathode. Before further describing the electrode structure, the cell which includes the electrode will now be described.

Figure 1:
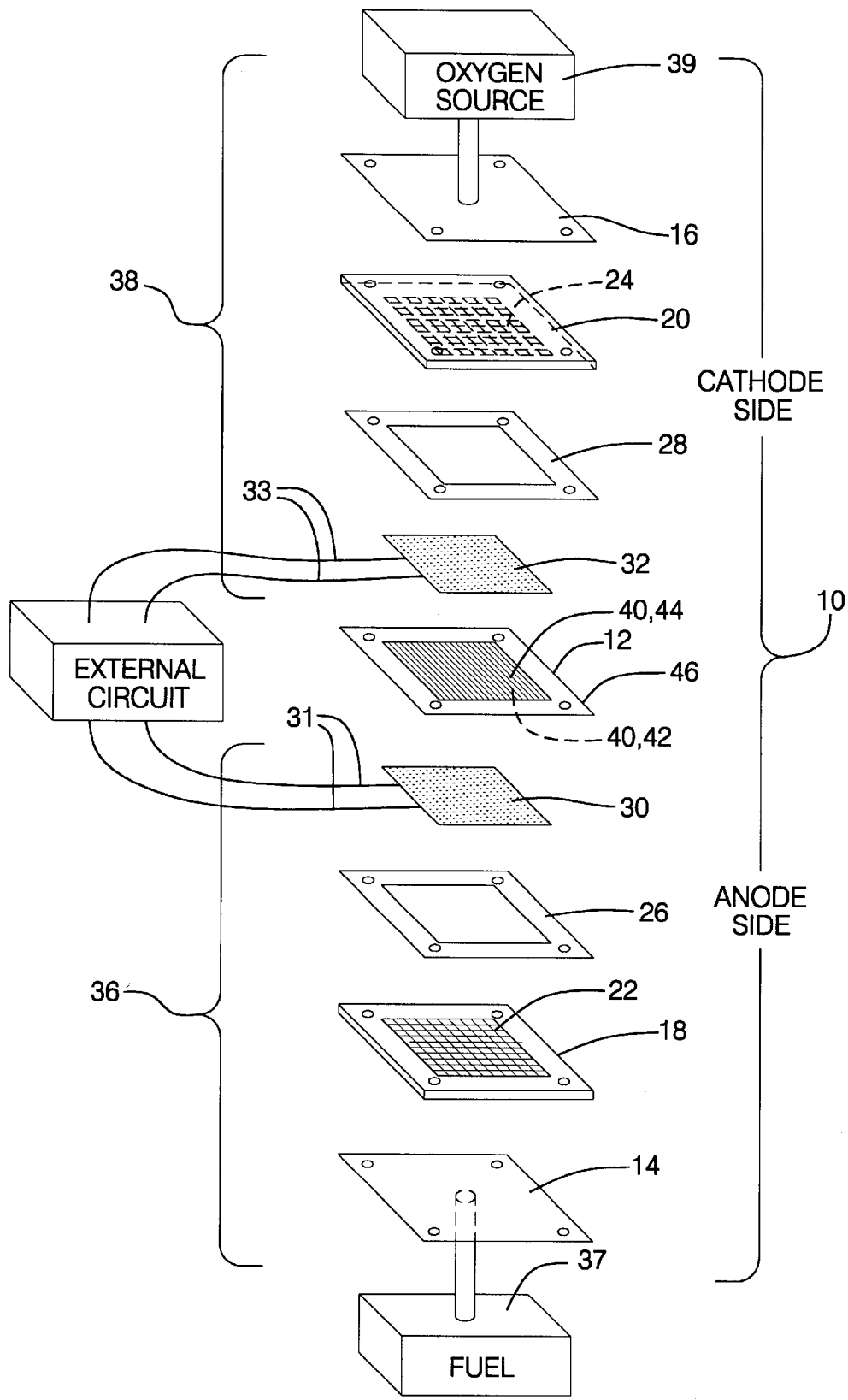
FIG. 1 is a schematic view of an unassembled electrochemical fuel cell having an electrode and a combination membrane and electrode assembly according to the invention.

Referring to FIG. 1, an electrochemical cell 10 with a combination membrane electrolyte and electrode assembly (MEA) 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14, 16, graphite blocks 18, 20 with openings 22, 24 to facilitate gas distribution, gaskets 26, 28, carbon sheet current collectors 30, 32 with respective connections 31, 33 and the membrane electrolyte and electrode assembly (MEA) 12. The two sets of graphite blocks, gaskets, and current collectors namely 18, 26, 30 and 20, 28, 32 are each referred to as respective gas and current transport means 36, 38. Anode connection 31 and cathode connection 33 are used to interconnect with an external circuit which may include other fuel cells.

Electrochemical fuel cell 10 operates with gaseous reactants, one of which is a fuel supplied from fuel source 37, and another is an oxidizer supplied from source 39. The gases from sources 37, 39 diffuse through respective gas and current transport means 36 and 38 to opposite sides of the MEA 12.

Figure 2:
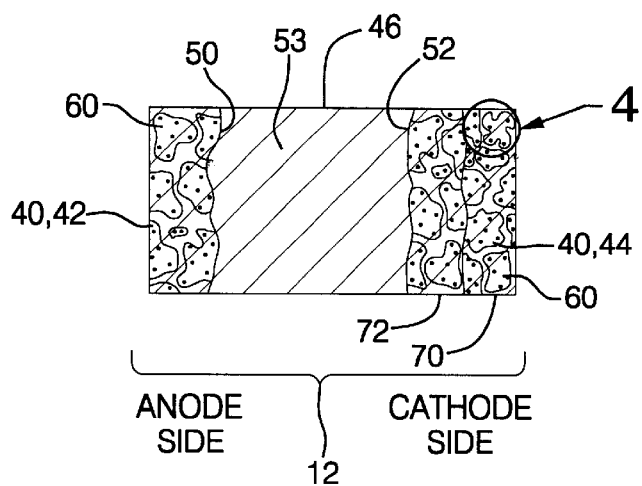
FIG. 2 is a pictorial illustration of a cross-section of a membrane electrode assembly according to the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. In one arrangement, the electrodes of the invention provide more effective proton transfer by close contact between the electrode and the ionomer membrane to provide essentially continuous polymeric contact for such proton transfer. Preferably, the electrode is inset or at least partially embedded in the membrane. Accordingly, the MEA 12 of cell 10 has membrane 46 with spaced apart first and second opposed surfaces 50, 52, a thickness or an intermediate membrane region 53 between surfaces 50, 52. Respective electrodes 40, namely anode 42 and cathode 44 are well adhered to membrane 46, at a corresponding one of the surfaces 50, 52.

In one embodiment, respective electrodes 40 (anode 42, cathode 44) further comprise respective first and second Teflonated (polytetrafluoroethylene coated, impregnated) graphite sheets 80, 82, at respective sides of membrane 46. (FIG. 3) The anode active material is disposed between the first surface 50 of the membrane and the first sheet 80; the cathode active material is disposed between the second surface 52 and the second sheet 82.

SPE Membrane

The solid polymer electrolyte (SPE) membrane 46, of the present invention is well known in the art as an ion conductive material. Such SPE membranes are also referred to as polymer electrolyte membranes (PEM). Typical SPE membranes are described in U.S. Pat. Nos. 4,272,353, 3,134,697, and 5,211,984.

The SPE membranes or sheets are ion exchange resin membranes. The resins include ionic groups in their polymeric structure; one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cation exchange, proton conductive resins is the so-called sulfonic acid cation exchange resin. In the sulfonic acid membranes, the cation ion exchange groups are hydrated sulfonic acid radicals which are attached to the polymer backbone by sulfonation.

The formation of these ion exchange resins into membranes or sheets is also well known in the art. The preferred type is perfluorinated sulfonic acid polymer electrolyte in which the entire membrane structure has ion exchange characteristics. These membranes are commercially available, and a typical example of a commercial sulfonated perfluorocarbon, proton conductive membrane is sold by E.I. Dupont de Nemours & Co., under the trade designation Nafion®. Another was developed by Dow Chemical. Such proton conductive membranes may be characterized by monomers of the structures $CF_2=CFOCF_2CF_2SO_3H$, $CF_2=CFOCF_2CF(CF_3)OCF_2SO_3H$, and $—CF_2CF_2CF(ORX)CF_2CF_2—$, where x is $SO_3H$ or $CO_2H$. Nafion® is a fluoropolymer, and more specifically, a copolymer which comprises perfluorinated carboxylic or sulfonic acid monomeric units. Nafion® polymers and polymer membranes are Nafion® polymers prepared from copolymers of tetrafluoroethylene and perfluorinated monomers containing sulfonic or carboxylic acid groups. The perfluorinated sulfonic copolymer is preferred for the invention.

In the electrochemical fuel cell 10 exemplified by the invention, the membrane 46 is a cation permeable, proton conductive membrane, having H+ ions as the mobile ion; the fuel gas is hydrogen (or reformate) and the oxidant is oxygen or air. The overall cell reaction is the oxidation of hydrogen to water and the respective reactions at the anode 42 and cathode 44, are $H_2=2H^++2e$ (anode) and $½O_2+2H^++2e=H_2O$ (cathode) Since hydrogen is used as the fuel gas, the product of the overall cell reaction is water. Typically, the product water is rejected at the cathode 44 which is the electrode 40 on the oxygen side. Typically, water then escapes by simple flow or by evaporation. However, means may be provided if desired, for collecting the water as it is formed and carrying it away from the cell. Water management in the cell is important to the successful long-term operation of the electrochemical fuel cell. Water management techniques and cell designs related thereto are described in U.S. Pat. Nos. 5,272,017 ('017) and U.S. Pat. No. 5,316,871 ('871), each incorporated herein by reference in its entirety. The present invention further improves water management during fuel cell operation, and is also directed to other features such as effective electrode utilization, effective proton transfer between electrodes and the membrane, and good gas diffusion. These features are at least partially enhanced by the improved electrode design of the invention.

Electrodes

The electrodes of the invention comprise a current collector and electrode active material which engages in cell reactions. Electrochemical reactions in a fuel cell occur in an interface region among the proton conductive ionomer, catalyst, electron-conducting carbon, and the gaseous reactant. Thus, for good catalyst utilization, the electrode should be designed so that the catalyst sites are in intimate contact with the proton exchange membrane, the gaseous reactant, and the electron-conducting carbon.

A conventional electrode may be made by methods as described in U.S. Pat. Nos. 5,272,017 and 5,316,871 incorporated herein above by reference. This is exemplified by the anode of FIGS. 2 and 3. In such configuration catalyzed carbon particles are prepared and then combined with the proton conductive binder in solution with a casting solvent. The solution is applied to a Teflonated graphite sheet 80, the casting solvent is evaporated and the remaining layer comprising catalyzed carbon particles and binder is then brought into contact with, and hot-pressed to, the membrane. Here the catalyzed carbon particles 60 are in intimate contact with and adhered to the membrane 46. As described herein, preferably some portion of the catalyzed carbon particles are at least partially embedded in membrane 46. FIG. 4 is a pictorial illustration showing the magnified view of a catalyzed carbon particle 60 with very finely divided catalytic particles 62 carried thereon. A proton conductive material 64 is intermingled with particles.

The new electrode configuration of the invention is described herein for use as a cathode, but is not limited thereby. It is thought to be useable for either an anode or a cathode, and is here demonstrated to be particularly advantageous when used as a cathode. The electrode of the invention comprises a current collector sheet 82, a first electrode layer 70, and a second electrode layer 72. The first electrode layer 70 is between the current collector sheet 82 and the second layer 72. The first electrode layer comprises a first group of carbon particles 60 and the second layer comprises a second group of carbon particles 60. The carbon particles of the first and second group may be the same type of carbon particles and have the same physical characteristics as shown in the tables. In another embodiment, the carbon particles of the first and second group are different types of carbon particles and have different characteristics. Characteristics are as defined in Table 2.

Figure 3:
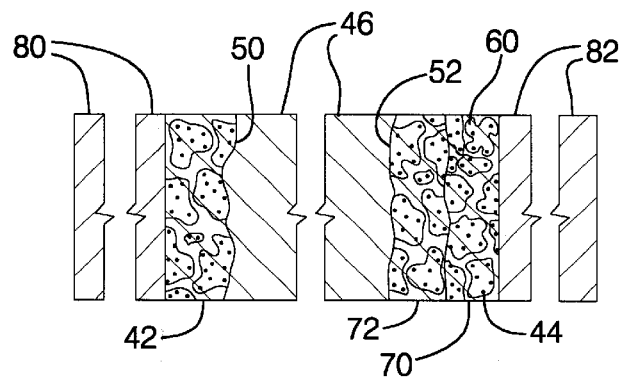
FIG. 3 is a pictorial illustration of another cross section of a membrane electrode assembly, and having graphite sheets.
Figure 4:
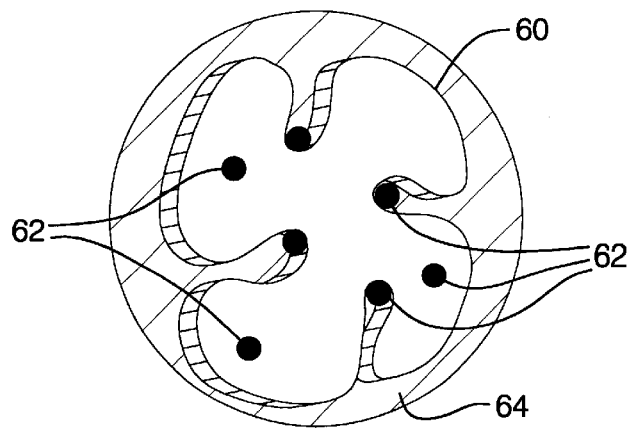
FIG. 4 is a magnified illustration showing a carbon particle supporting catalytic particles and intermingled with proton conductive material.

In one embodiment, the carbon particles of the first group are uncatalyzed (FIG. 3). In another embodiment, the carbon particles of the first group forming the first layer are catalyzed (FIG. 2). The catalyst 62 is in the form of very finely divided catalytic particles, and typically are metallic particles as further described below. In both embodiments, the second layer 72 is catalyzed with finely divided catalytic particles 62. The relative content of catalytic 62 and carbon particles 60 of the first and second layers is selected so that the weight ratio of catalytic particles to carbon particles of the first layer 70 is less than that of the second layer 72. It is evident that where the first layer does not contain any catalyst particles and the second layer is catalyzed, this condition will be met. In the embodiment where catalytic particles are included in both layers, the weight ratio of catalytic particles to carbon particles in the second layer is greater than that of the first.

In one embodiment, the carbon particles of the first layer comprise a plurality of internal and external surfaces defining a plethora of pores; and the very finely divided catalytic particles are supported on the internal and external surfaces of the carbon particles (FIG. 4). Preferably the carbon particles 60 are catalyzed with the catalytic particles 62 before being mixed with a proton conductive material 64 to form the first layer.

In one embodiment, the second layer is formed in essentially the same way as the first layer. That is, carbon particles are catalyzed with the catalytic particles and then the catalyzed carbon particles are mixed with the proton conductive material. This mixture is then applied to the first layer in order to form the second layer.

The catalytic particles are preferably metallic, metals or alloys. Most preferred are noble metal catalysts such as platinum (Pt) and palladium (Pd). In addition, other relatively stable metals can be used, including for alloying. Examples are titanium, ruthenium, rhodium, tungsten, tin or molybdenum.

The invention provides a method for forming the multi-layered electrode, having at least first and second layers. The first layer is also referred to as primary layer and the second layer being the main layer. The method of making an electrode structure comprises the steps of (a) providing a current collector sheet 82; (b) forming a first layer 70 on the sheet which comprises proton conductive material 64, a first group of carbon particles 60, and optionally catalytic particles 62; and (c) forming a second layer 72 over the first layer, where the second layer comprises proton conductive material 64, a second group of carbon particles 60, and catalytic particles 62. The amount by weight of catalytic particles relative to carbon particles of the second layer is greater than that of the first layer. In one embodiment as per the aforesaid method, step (a) is conducted by forming a first mixture of proton conductive material, a first group of carbon particles, and a first group of finely divided catalytic particles supported on and in the carbon particles; and applying the first mixture onto the surface of the current collector and forming a first film from the mixture.

In one embodiment, step (c) is conducted by forming a second mixture of proton conductive material, a second group of carbon particles and a second group of finely divided catalytic particles supported on and in the carbon particles; and applying the second mixture onto the first layer.

The membrane electrode assembly is prepared by applying the multi-layer electrode and a counter-electrode to a respective surface of the membrane and then hot-pressing at a temperature and compressive load sufficient to adhere the electrodes to the membrane. Preferably at least a portion of the particles of the electrodes are at least partially embedded in the membrane which becomes softened during the high temperature hot-pressing.

More specifically, the active material of the anode 42 is applied to Teflonated graphite sheet 80. Then, the anode active material side carried on sheet 80 is contacted with the first surface 50 of the membrane 46. The multi-layer active material of the cathode 44 on sheet 82 is contacted with second surface 52 of the membrane 46. The applied sheets 80, 82 are hot-pressed to the membrane while being heated for a time and at a temperature and compressive load sufficient to soften the membrane 46 and at least partially embed at least a portion of the particles in the membrane to thereby form the first and second electrodes 42, 44. The embedded or inset particles are at least partially set in respective surfaces of the membrane although they may not be totally encompassed by the membrane or disposed below its surface.

The step of heating while pressing is conducted at about 250 to about 1000 pounds per square inch compressive load for about one to about five minutes, and at a temperature of about 280° F. (130° C.) to about 320° F. (160° C.). It has been found that a compressive load of about 500 pounds per square inch for about 1 to about 2 minutes at a temperature of about 300° F. (about 150° C.) is effective. The compressive load may vary with time. That is, less load and longer times may be used and the converse also applies.

The embedding of electrodes into the membrane under pressure, provides for a continuous path of proton conductive material from one side of the membrane electrode assembly to the other. The intimate intermingling of proton conductive material with catalyst and carbon particles provides a continuous path for protons to the catalyst site where reaction occurs. The method also achieves a relative optimum utilization of catalytic particles, including adjacent the membrane at the electrode.

The proton conductive material and the catalytic and carbon particles, forming the anode and the cathode main (second) layer, are in a weight proportion based on 100 parts, of about 30 to about 70 parts proton conductive material and the balance being catalytic and carbon particles. And, the catalytic and carbon particles are in a proportion based on 100 parts by weight of up to about 20 parts catalytic particles and the balance being carbon particles. The cathode primary (first layer) is uncatalyzed or contains a lesser proportion of catalytic particles. The amount is on the order of 0.02 mg/cm$^2$ catalytic particles. This corresponds to about 5 parts by weight catalytic particles and 95 parts by weight carbon particles.

In one embodiment the cathode comprises a first layer which contains carbon particles intermingled with proton conductive material; alternatively, the first layer contains carbon particles catalyzed with a low amount of platinum on the order of 0.02 mg/cm$^2$ (5 weight percent platinum) and the balance carbon. This layer generally contains 40 weight percent proton conductive material (Nafion) and the balance, the carbon or catalyzed carbon, on the order of 60 weight percent. This layer typically has a thickness of about 10 to about 13 microns. The second layer contains carbon particles catalyzed with 20 weight percent platinum. The weight proportion of Nafion to catalyzed carbon in the main layer is in a range of 30 to 35 weight percent Nafion (proton conductive material) and 65 to 70 weight percent catalyzed carbon. It is desirable that the carbon exhibit a pH in a slurry constituting the carbon and water of about 6 to 9 pH. Preferably, the pH is greater than 6.5, and is about 6.5 to about 9. It is preferred that the average pore size be equivalent to a radius of greater than 5 nanometers. This represents the average pore size of both mesopores and micropores. It is preferred that the current collector, supporting the primary (first layer) and main (second layer), has a density on the order of 0.3–0.35 gm/cm$^2$.

EXAMPLE

In this example, a membrane electrode assembly (MEA) 12 was made. The anode was made by conventional means and the cathode electrode was made by the improved method of the invention. In both cases carbon paper was used for the current collector and supported the active material components of the electrode. In this example both Nafion® and Teflon® are used. Nafion® membrane and Nafion® solution were obtained from DuPont and Solution Technology, respectively. Nafion® is a registered trademark of DuPont. Teflon® is also a trademark of DuPont.

Carbon Sheet Treatment

SpectraCarb (SC) Carbon sheets for the current collector were obtained from Spectra Corp. Lawrence, Mass., in the thickness range 8–11 mils and density varying from 0.26 g/cc to 0.7 g/cc. Carbon paper was coated with Teflon by placing it horizontally on a rack and then dipping the paper and rack in a well-stirred Teflon/water mixture for 2 minutes. Teflon suspension was prepared by mixing 1 part of Teflon 30 B solution from DuPont with 24 parts of de-ionized water by volume. After drying the sheet at 120° C. for 15–20 minutes, the paper was sintered at 320° C. for 15 minutes and 380° C. for 30–60 minutes in a muffle oven. The Teflon content of the sheet was calculated by weighing the sheet before and after the Teflon treatment. The distribution of Teflon in the carbon sheet was measured using electron microprobe analysis. It was observed that the top portion of the sheet had a higher Teflon content than the bottom side.

MEA Preparation

After coating the carbon sheet with Teflon, the side with the higher Teflon content was chosen for coating a dual layered electrode structure. The primary layer consisted of a barrier layer to prevent the penetration of the catalyst slurry into the carbon sheet. The slurry for the primary carbon/barrier layer was prepared by mixing 1 g acetylene black (AB) with 5 w/o Pt, 10 g de-ionized water and 13.4 g Nafion solution (5% solution, Solution Technology) in an ultrasonic bath for 2–3 minutes to form a thick slurry. After applying a layer of the AB slurry on the top side of a Teflonated carbon sheet using a brush, doctor blade, or spray gun, the sheet was dried under a heat lamp for 15 minutes at 100° C. The dry film had a catalyst loading of 0.02 mg/cm$^2$, Nafion loading of 40 w/o and carbon black loading of 60 w/o. TEM studies revealed the thickness of the primary layer to be 10–13 $\mu$m.

To support the cathode catalyst in the main catalyst layer (second layer), nine carbon supports with different properties were evaluated. The anode catalyst support was Vulcan XC-72R prepared by conventional means. Carbons used for the cathode catalyst were used both in the as-received and heat treated forms. Heat treatment was done at 1000° C. for 1 hour in argon. The carbons were catalyzed with a platinum (Pt) catalyst. The catalyst was prepared by adding an aqueous solution of hexachloroplatinic acid (Johnson Matthey) to a carbon/water mixture followed by agitation for 1 hour. Pt (IV) was then reduced to the metallic state by the addition of an excess of sodium borohydride that was added dropwise to the carbon slurry. After stirring the mixture for another hour, the solution pH was adjusted to ca. 7.0 by adding 1M sulfuric acid. Finally, the platinum loaded carbon mixture was filtered, washed thoroughly with water and dried in air at 100 C. overnight. A slurry was then prepared by thoroughly mixing the platinized carbon with 5 w/o Nafion solution (Solution Technology, Inc., Mendenhall, Pa.). The catalyst slurry was applied to the carbon sheet, which had already been coated with the primary layer (first layer). The catalyst slurry was applied by brushing, and the electrodes were dried at 100° C. for 1 hour. The Pt loadings were calculated by weighing the thoroughly dried carbon sheets before and after application of each layer. To prepare the MEA, a Dow experimental membrane or a Nafion 112 membrane was sandwiched between the two electrodes and the MEA hot pressed at 500–1000 lb./in$^2$ for 1.5–2.0 minutes at 300° F.

MEA Evaluation

The membrane electrode assembly with a 25 cm$^2$ active electrode area was positioned in the single cell test fixture (Electrochem, Inc.) made of graphite. The single cell was operated by a Globe-Tech fuel cell test station that controlled the cell potential or current, temperature, pressure, mass flow of gases, and humidification of reactant gases using an IBM PC-based data acquisition and control system. To condition the MEA, the cell was operated for 24 hours at 1 A/cm$^2$ with hydrogen/oxygen as reactants at 80° C. and 30 psig pressure. The current-voltage curve was recorded with H$_2$/air as reactants at 80° C. and various gas pressures. The reactant stoichiometry was 2.5–3 for air and 1.2–1.5 for H$_2$. At the end of each test, cyclic voltammograms (CV) of the MEA were recorded to determine the electrochemical active surface area of the Pt catalyst at the cathode, as described earlier.

EXPERIMENTAL RESULTS

Effect of Current Collector Treatment

Figure 5:
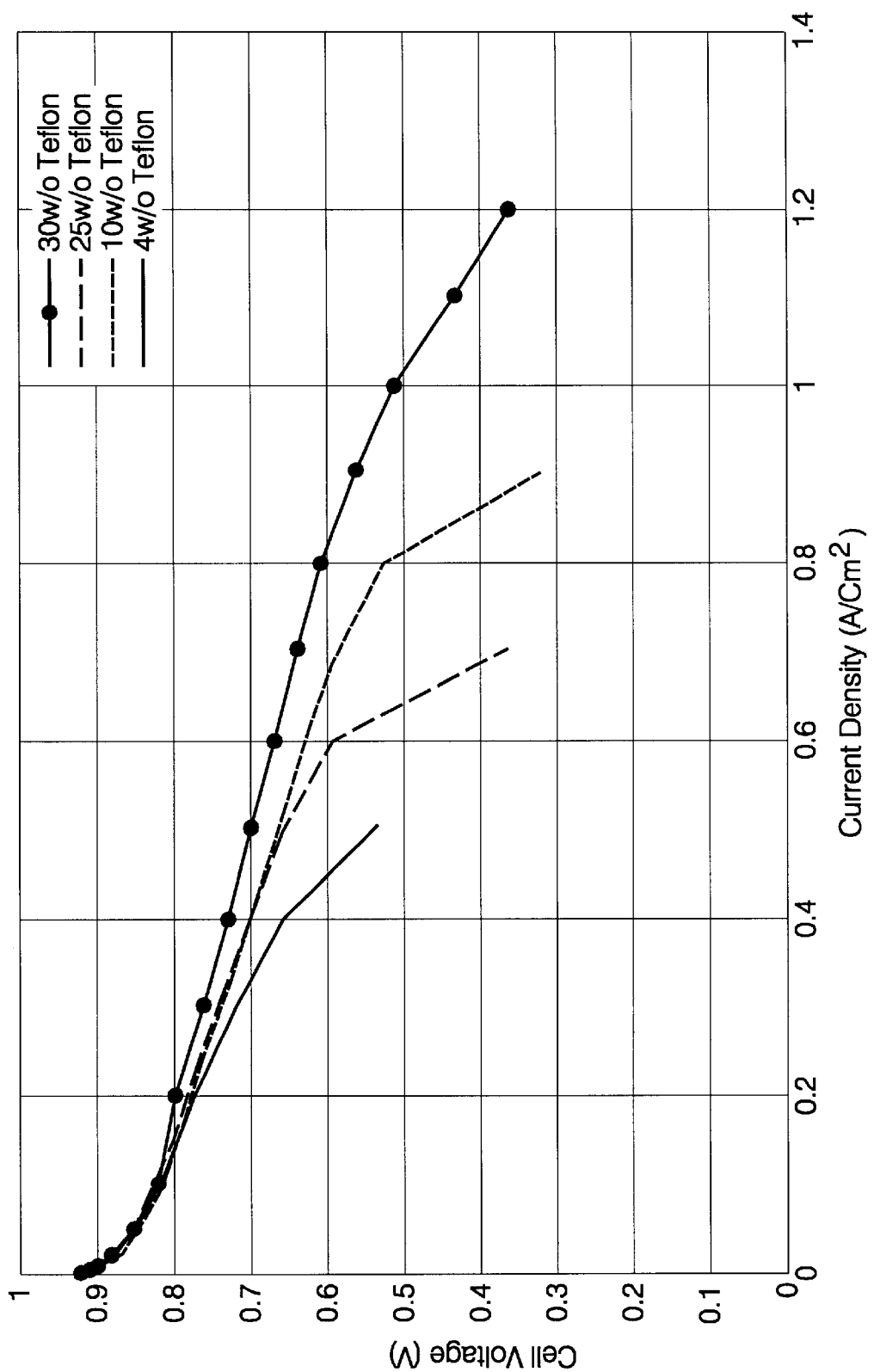
FIG. 5 shows the effect of the current collector Teflon content on a PEM fuel cell operated at 80° C., Air/$H_2$, 3/1.2 Stoic, 30 psig. 20 w/o PtVu, 10 mil SC, 0.5 g/cc, Nafion 112 membrane, Pt loading=0.28 mg/$cm^2$/electrode.

Graphite sheets were used as current collector and gas diffuser after loading them with a wet-proofing agent such as Teflon®. In addition to varying the Teflon loading in the carbon sheet, the density of the carbon sheet was also varied. 20 w/o Pt (supported on Vulcan XC-72R carbon) was used as the catalyst and the MEA was made with Nafion 112 membrane and a Pt loading of 0.28 mg/cm$^2$/electrode. FIG. 5 shows the effect of varying the current collector Teflon content on the fuel cell performance. As the Teflon loading is increased, the cell performance drops off at lower current densities. An increase in electrode resistivity due to a higher level of non-conducting Teflon polymer in the matrix is also observed as a secondary effect. Since Teflon is added to enhance the hydrophobicity of the electrode, it appears that an increase in hydrophobicity leads to difficulty in the removal of water from the reaction sites. This leads to electrode flooding that causes the sharp drop off in current at various voltages as the Teflon content is increased. The highest fuel cell performance (820 MA/Cm$^2$ at 0.6V) in this series of experiments was obtained at the lowest graphite paper Teflon content of 4 w/o (weight percent). That is, 4 weight percent Teflon and 96 weight percent graphite paper.

Figure 6:
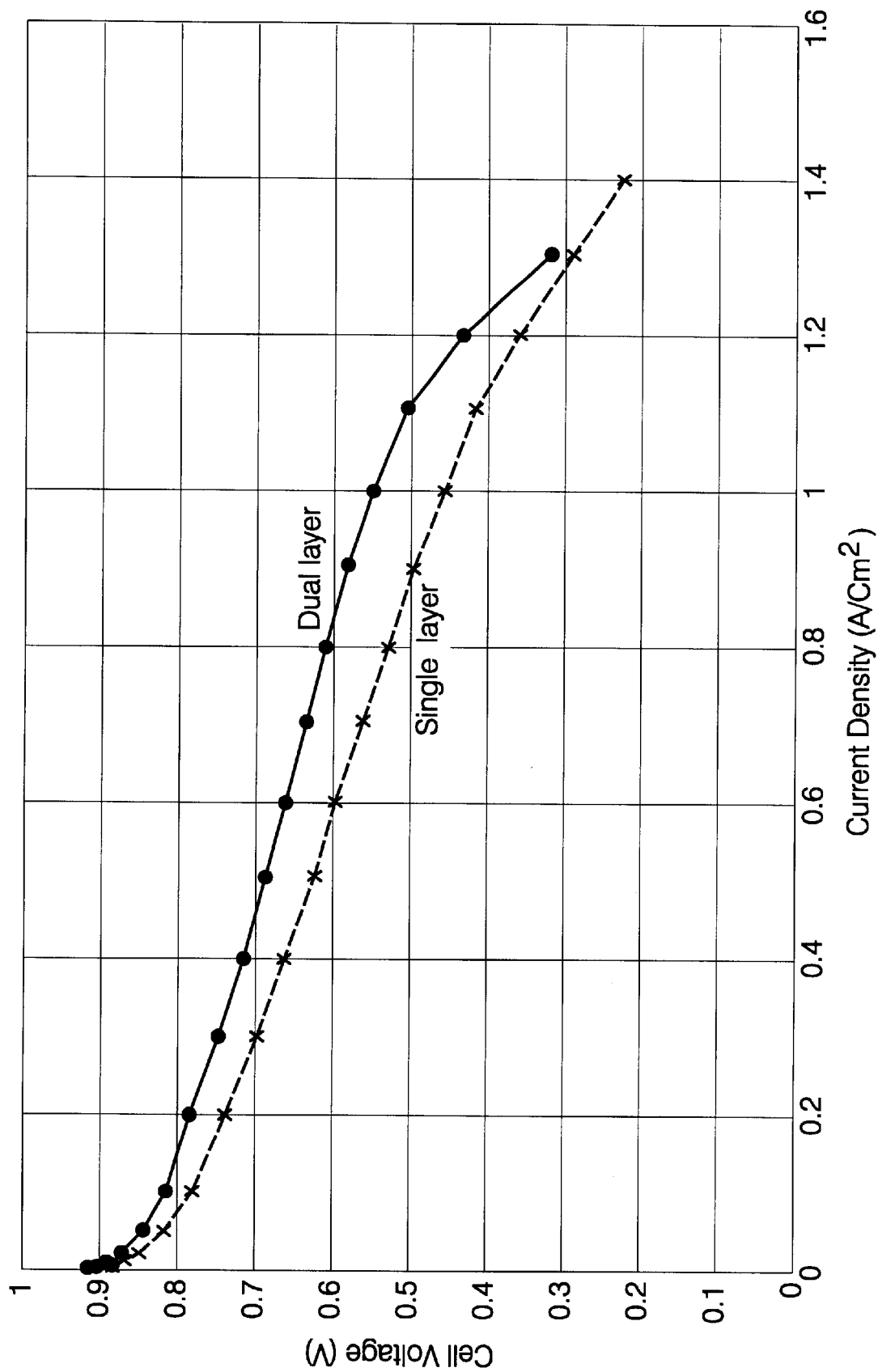
FIG. 6 shows the effect of using a primary carbon/catalyst layer on PEM fuel cell performance 20 w/o PtVu and 5 w/o Pt/AB were used for the main and primary layers, respectively. Nafion 112 membrane; Pt loading: 0.35 mg/$cm^2$/electrode; Air/$H_2$, 80° C., 30 psig; 3/1.2 stoichiometry.

The effect of applying a primary carbon layer on the graphite sheet prior to coating the main catalyst layer is shown in FIG. 6. The primary layer helps improve the fuel cell performance by densifying the main catalyst layer near the membrane interface. The catalyst slurry now does not penetrate the graphite sheet and hence the primary carbon layer (first layer) is an important enabler for the use of low-density carbon sheets that show superior performance as described below.

Figure 7:
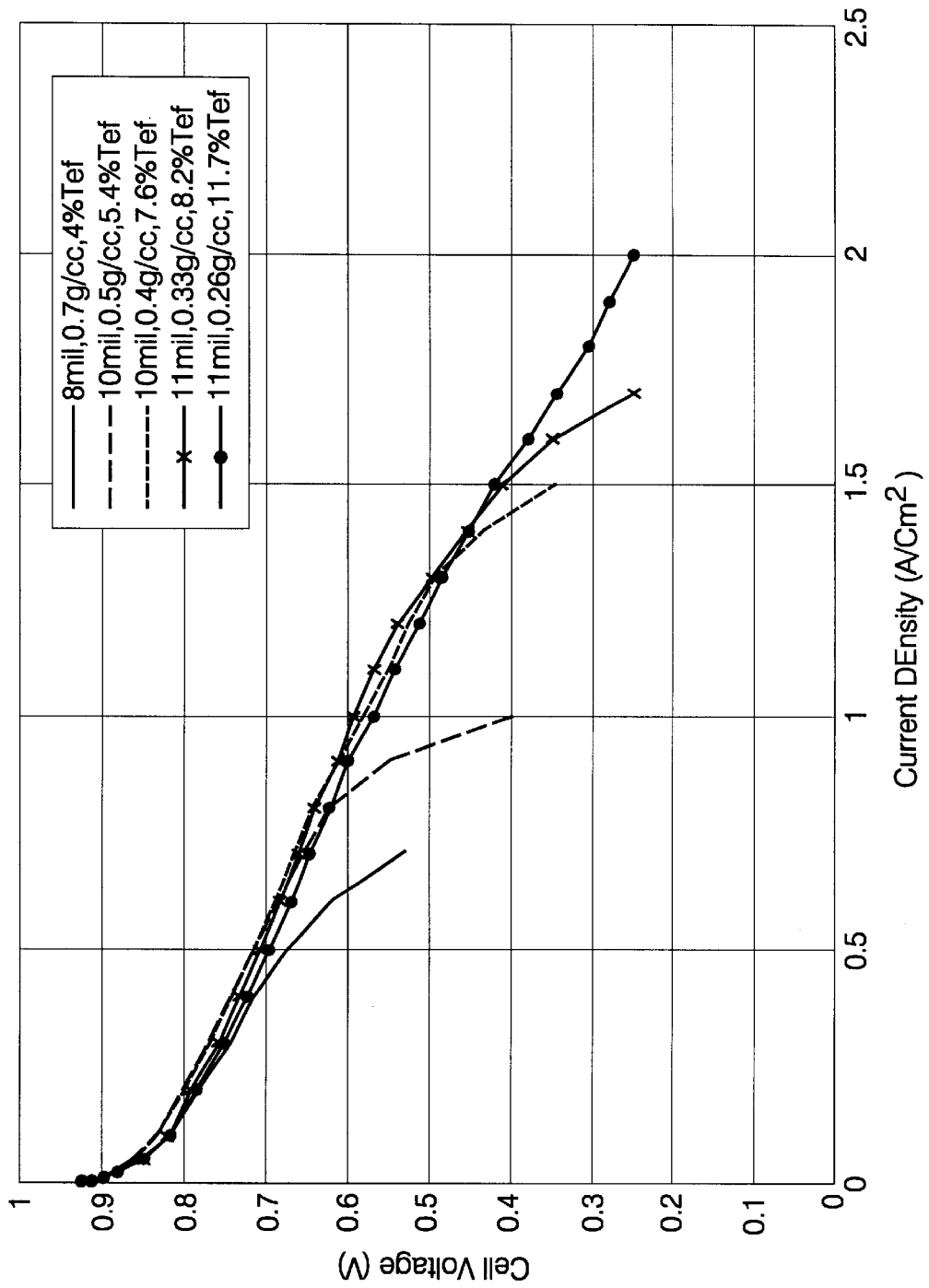
FIG. 7 shows the effect of current collector density on the PEM fuel cell performance operated at 80° C., Air/$H_2$, 3/1.4 Stoic and 30 psig. 20 w/o PtVu, Nafion 112 membrane, Pt loading=0.3 mg/$cm^2$/electrode.

The effect of carbon sheet current collector density in the range 0.26 g/cc to 0.7 g/cc on the PEM fuel cell performance was studied and the results are shown in FIG. 7. The density of the paper clearly determined the current density at which the voltage dropped abruptly due to mass transport limitations. Lower density sheets are more porous and the macroporosity helps in easy removal of water even at high current densities. As the paper density was decreased from 0.7 to 0.26 g/cc, two effects were observed. First, the current density at 0.6V increased from 0.62 A/cm$^2$ to a maximum of 1 A/cm$^2$ at 0.33 g/cc before decreasing at 0.26 g/cc. This improvement in cell performance was observed in spite of the increase in Teflon content from the optimum level of 4 w/o to as high as 8 w/o at a density of 0.33 g/cc. As the paper density decreased, the Teflon content increased from 4 to 11.7 w/o due to the higher Teflon uptake at low densities from a slurry which had a constant Teflon concentration in solution. This increase in Teflon content probably caused the maximum in the current density at 0.6 V at a paper density of 0.33 g/cc. Second, the maximum current density in the linear region of the current-voltage curve (prior to the sharp drop) increased from 0.6 A/cm$^2$ to a value as high as 1.8 A/cm$^2$ at the lowest density of 0.26 g/cc. Thus, a current collector density of 0.3 to 0.35 g/cc appears to be optimum for cathode applications.

Effect of Nafion Content in the Main Catalyst Layer

Figure 8:
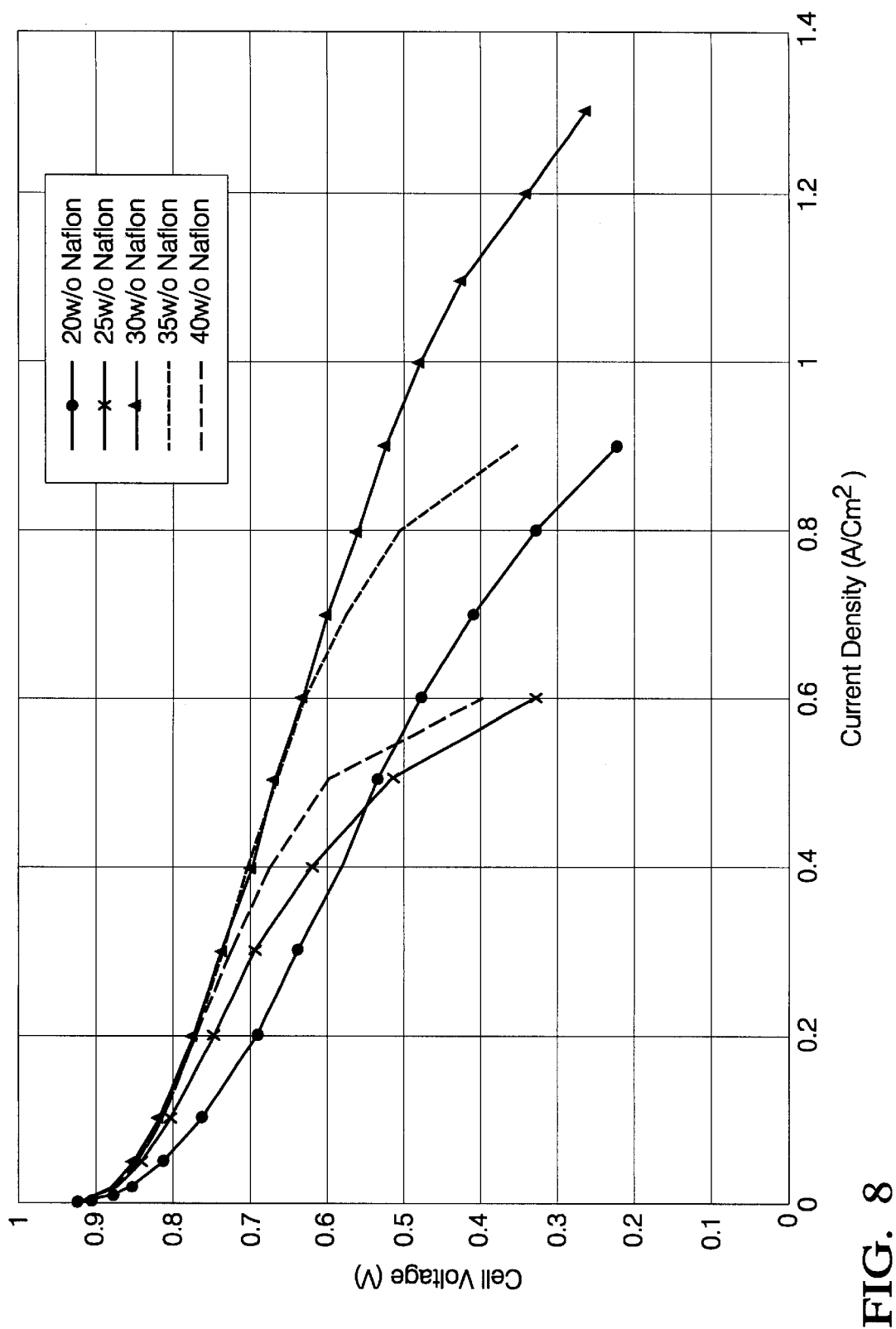
FIG. 8 shows the effect of cathode Nafion content on the PEM fuel cell performance when operated at 80° C., Air/$H_2$, 3/1.5 Stoic 55/30 psig 20 w/o PtVu, 10 mil SC 0.42 g/cc, 19 w/o Teflon, Dow membrane Pt loading=0.45 mg/$cm^2$/Cell.

The catalyst layer needs the proton conducting Nafion polymer in its matrix to ensure good contact of all catalyst particles with the electrolyte. However, the amount of Nafion must be optimized, since any excess can lead to water retention and the consequent flooding of catalyst sites. FIG. 8 shows the effect of cathode Nafion content on the PEM fuel cell performance. This series of experiments used 20 w/o Pt/Vulcan XC-72R catalyst prepared in house, graphite paper (10 mil, 0.42 g/cc) from SpectraCorp, with Teflon content of 19 w/o. An increase in Nafion content from 20 w/o to 30 w/o (weight percent) saw a dramatic improvement in the fuel cell performance whereas any further increases led to a decrease in cell performance.

To interpret the effect of Nafion loading, the real surface area of platinum catalyst was determined by the electrochemical hydrogen adsorption method and the results are shown in Table 1. At Nafion loading less than 30 w/o, any increase in the Nafion content is seen to increase the real Pt surface area. As a result, this increases the accessibility of catalyst sites to the proton-conducting electrolyte. To take into account differences in the actual Pt loading, the Pt surface area was normalized using the total Pt loading, the geometric surface area and the absolute electrochemical area. It is seen from Table 1 that an increase in Nafion content from 20 to 30 w/o resulted in a 57% increase the normalized surface area, thus explaining the large increase in fuel cell performance. Increases in Nafion loading above 30 w/o led to only minor increases in the real area which did not benefit the fuel cell performance due to deleterious effects of excess Nafion on the electrode water management.

It was determined that a higher Nafion loading is needed in the primary layer (first layer) since Nafion is a binder, and good binding is needed between the main or catalyst layer (second layer) and the carbon sheet. When Nafion loading in the primary layer was dropped to 30–35%, cracking of the main or catalyst layer (second layer) was observed. The fuel cell performance was also lower in an experiment conducted with 30% Nafion in the primary layer.

Effect of Carbon Support in the Main Catalyst Layer

Physico-chemical properties of carbon supports used to disperse the fuel cell catalysts have a crucial role to play in the cell water management, especially at the air cathode. In U.S. Pat. Nos. 5,272,017 and 5,316,817 under ambient conditions, ball milled Vulcan XC-72R for the anode and the as-received Ketjen black for the cathode yielded superior performance. It has been determined that physical properties such as total surface area, pore distribution, pore volume, and average pore size determine the degree of dispersion of the Pt catalyst and the extent of flooding in the pores driven by capillary forces. Chemical properties such as the surface chemical composition, as measured by the slurry pH, determine the degree of hydrophobicity of the pore walls. Semi-hydrophobic regions ensure rejection of water from the electrode matrix and enable facile transport of reactant gases to catalyst sites. Table 2 lists various physicochemical properties of carbon blacks that are of interest to fuel cell electrode performance. Micropores in carbons have pore sizes less than 2 nm in diameter, whereas mesopores have pore diameters in the range 2–50 nm. Acetylene Black has the highest percentage mesopore area and AX-21 the least. Carbons have both acidic and alkaline pH in the as-received forms, but heat treatment makes them all alkaline. Ketjen Black and Black Pearls 2000 carbons have the highest pH and Raven 5000 the lowest pH in the as-received form. Also of interest in electrode fabrication is the density of carbon particles and the pore volume available for gas diffusion. This may be assessed from the volume of 1 gram of carbon black loaded with 10 w/o Pt and shown in FIG. 9. Acetylene Black and Raven 5000 had the highest and the lowest carbon volumes, respectively. Vulcan XC-72R, Ketjen Black, Printex, and Black Pearls 2000 had similar pore volumes.

Figure 10:
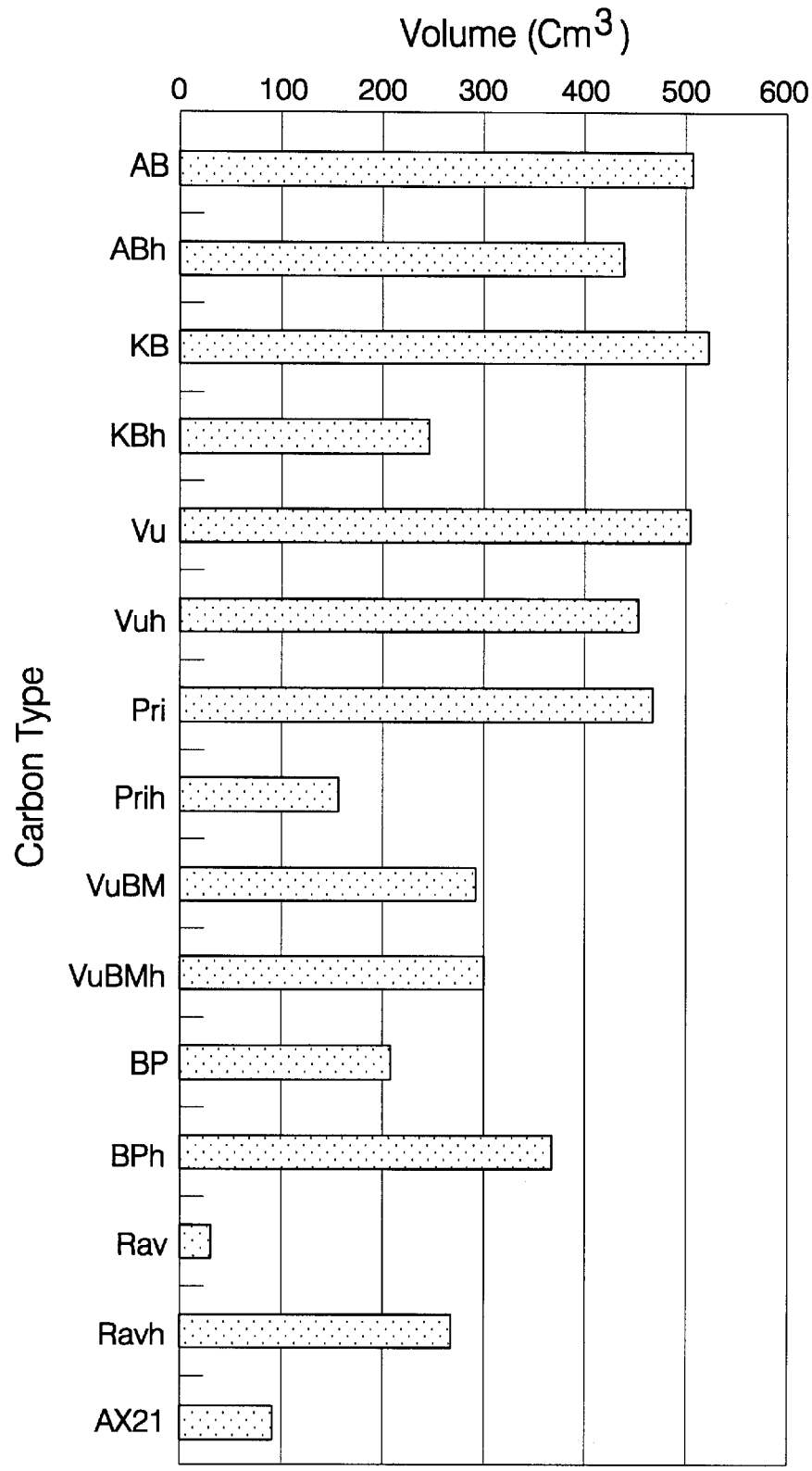
FIG. 10 shows the effect of carbon type on PEM fuel cell performance when operated at 0.5V, 80° C., Air/$H_2$, 30 psig, 3/1.5 Stoic 10 w/o Pt/Carbon, 10 mil SC, 0.42 g/cc, 25 w/o Teflon, Dow membrane, Pt=0.11±0.02 mg/$cm^2$/electrode.
Figure 11:
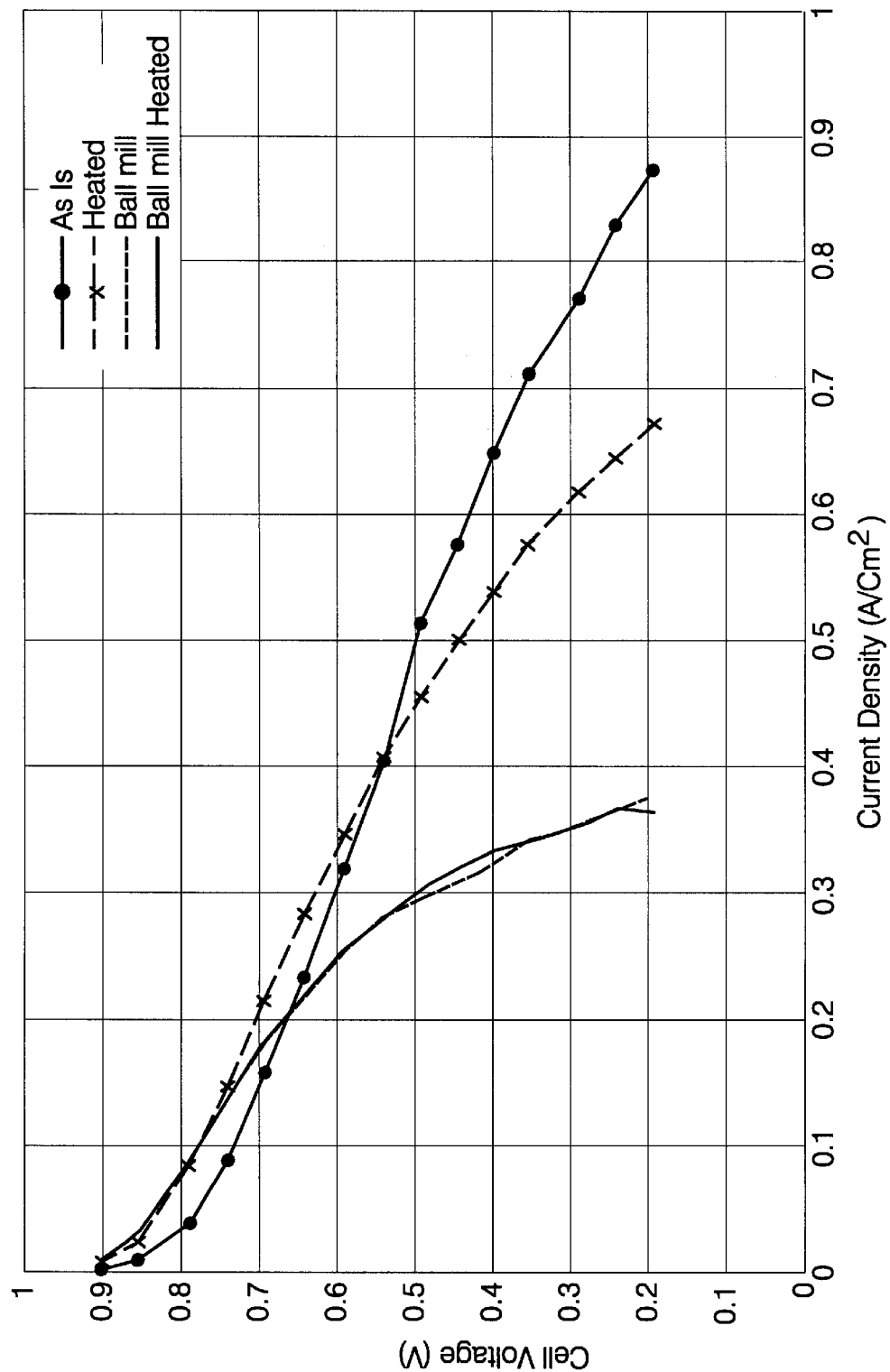
FIG. 11 shows the effect of Vulcan XC-72R treatment on PEM cell performance when operated at 80° C., Air/$H_2$, 30 psig, 3/1.5 Stoic 10 w/o PtVu, 10 mil SC, 0.42 g/cc, 25 w/o Teflon, Dow membrane, Pt=0.23 mg/$cm^2$/Cell.

FIG. 10 gives the fuel cell performance for the various as-received and heat treated carbon blacks. Though these experiments were not carried out with the optimum current collector thickness or Teflon loading, they show an important trend in the results that could be correlated with the hydrophobicity of the supports. Unlike in the ambient case, when KB emerged as clearly the best, the high temperature and pressure experiments show that Acetylene Black, Ketjen Black and Vulcan XC-72R show similar performances. Heat treatment of Acetylene Black, Ketjen Black, Printex and Vulcan XC-72R resulted in a drop in cell performance compared to the as-received carbons. Heat treated Raven 5000 and Black Pearls 2000 showed a dramatic increase in cell performance of 88% and 43%, respectively. Vulcan XC-72R was subjected to various physical treatments such as ball milling, heat treatment, and a combination of ball mill and heat treatment and the results are shown in FIG. 11. Ball milling the Vulcan XC-72R or the combination of ball milling/heating resulted in a 40% drop in cell performance. One possible explanation could be the decrease in carbon volume (by 60%) and the average pore radius (by 30%) due to ball milling that may have led to mass transport limitations.

Figure 12:
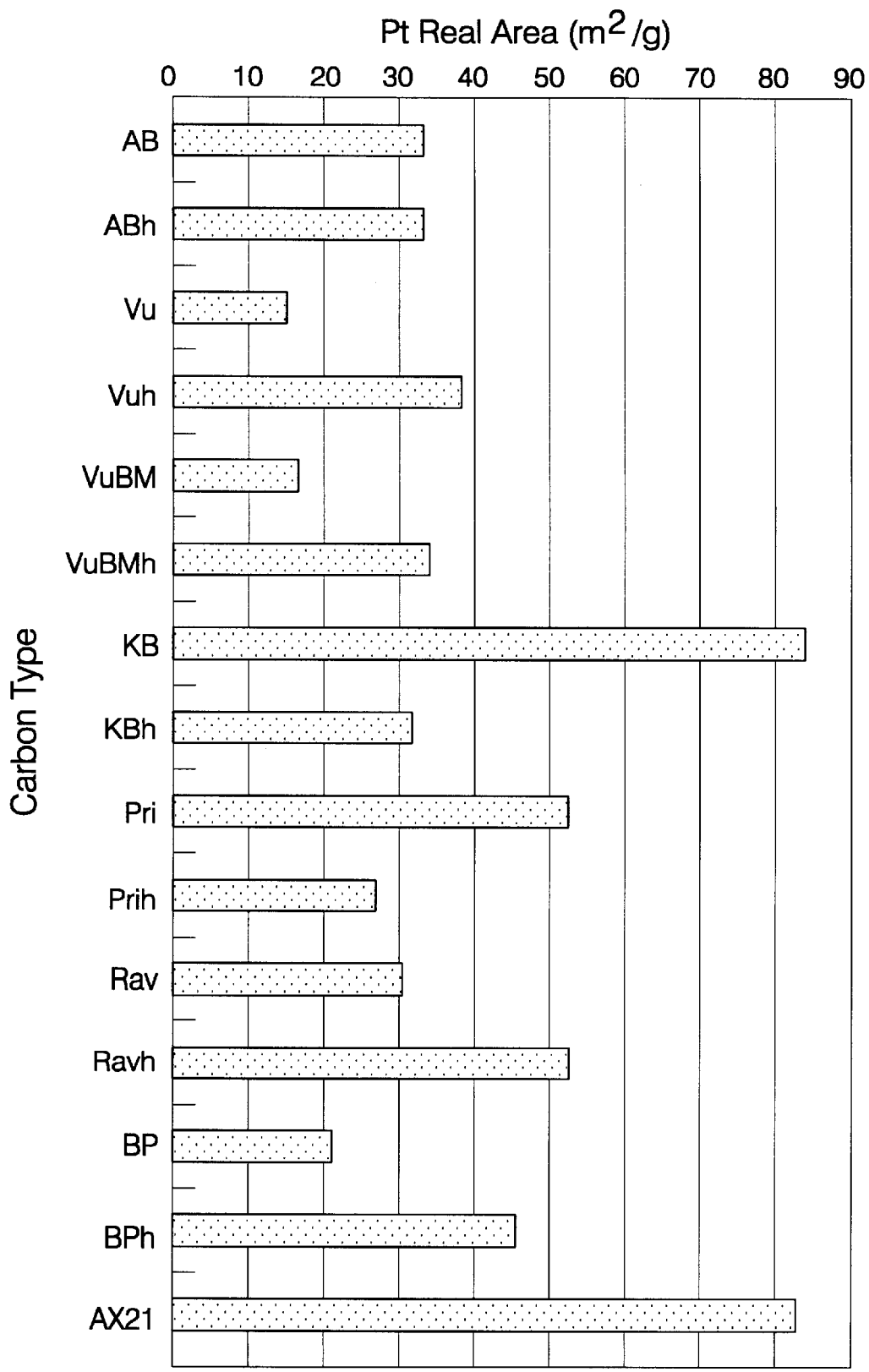
FIG. 12 shows the effect of carbon type on the platinum electrochemical surface area.
Figure 13:
FIG. 13 shows the plot of cell current density at 0.5 Volts against the pH of the carbon slurry used to disperse the Pt catalyst. Experimental conditions same as FIG. 10.
Figure 14:
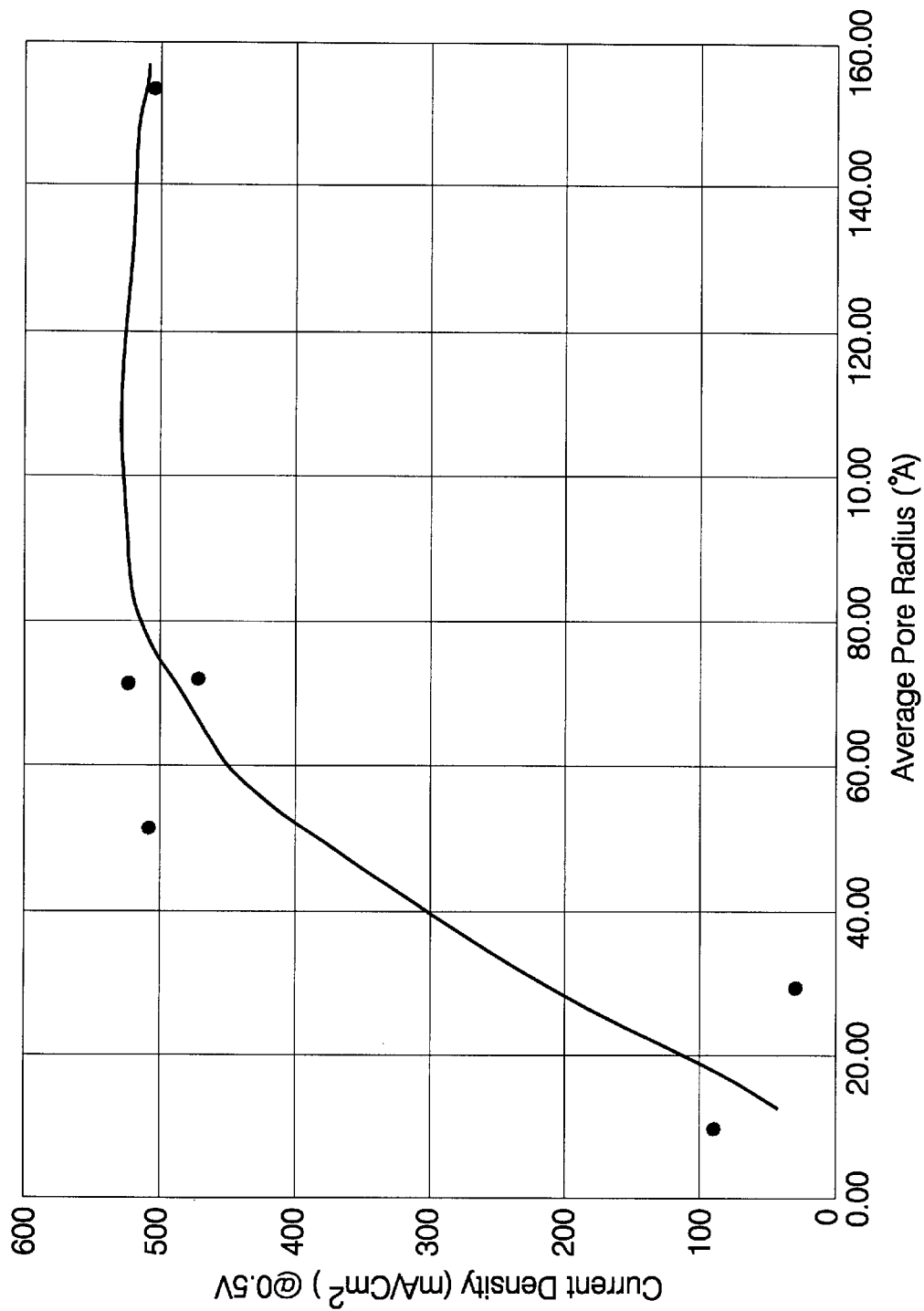
FIG. 14 shows the plot of cell current density at 0.5 Volts against the average pore radius of the cathode carbon support. Experimental conditions same as FIG. 10.

Further insights into why heat treatment deteriorates the performance of certain carbons while dramatically increasing the performance of others were obtained by measuring the real platinum surface area of the Pt catalyst dispersed on various carbons. FIG. 12 shows the effect of carbon type on the platinum real surface area, Ketjen Black and AX-21 showed the highest platinum surface area of 84 $m^2/gm$, but AX-21 showed the lowest cell performance. This re-emphasizes the role of the physicochemical properties of the carbon in improving the utilization of the dispersed platinum catalyst. It is interesting that the real Pt area of the catalyst dispersed on Ketjen Black and Printex showed a 50% drop in platinum surface area due to heat treatment. This shows that a highly hydrophobic support is not conducive towards good dispersion of the platinum catalyst, since the platinum solution needs to penetrate the carbon pores during deposition. This explains why the as-received KB, AB and Vulcan were superior performers compared to their heat-treated versions. It is concluded that carbon blacks with a slurry pH in the neutral range 6–9, especially in the as-received forms, and an average pore radius greater than 5 nm (FIGS. 9 and 10) are best suited for the dispersion of Pt catalyst for PEM fuel cell cathode applications. The slurry pH is a measurement of pH of carbon slurry in water.

The pH of the primary carbon layer (first layer) was not varied, since acetylene black (AB) had an optimum pH for a semi-hydrophobic support. Also, the optimum pH range for the primary layer (first layer) is unlikely to be very different from the main or catalyst layer (second layer).

Figure 9:
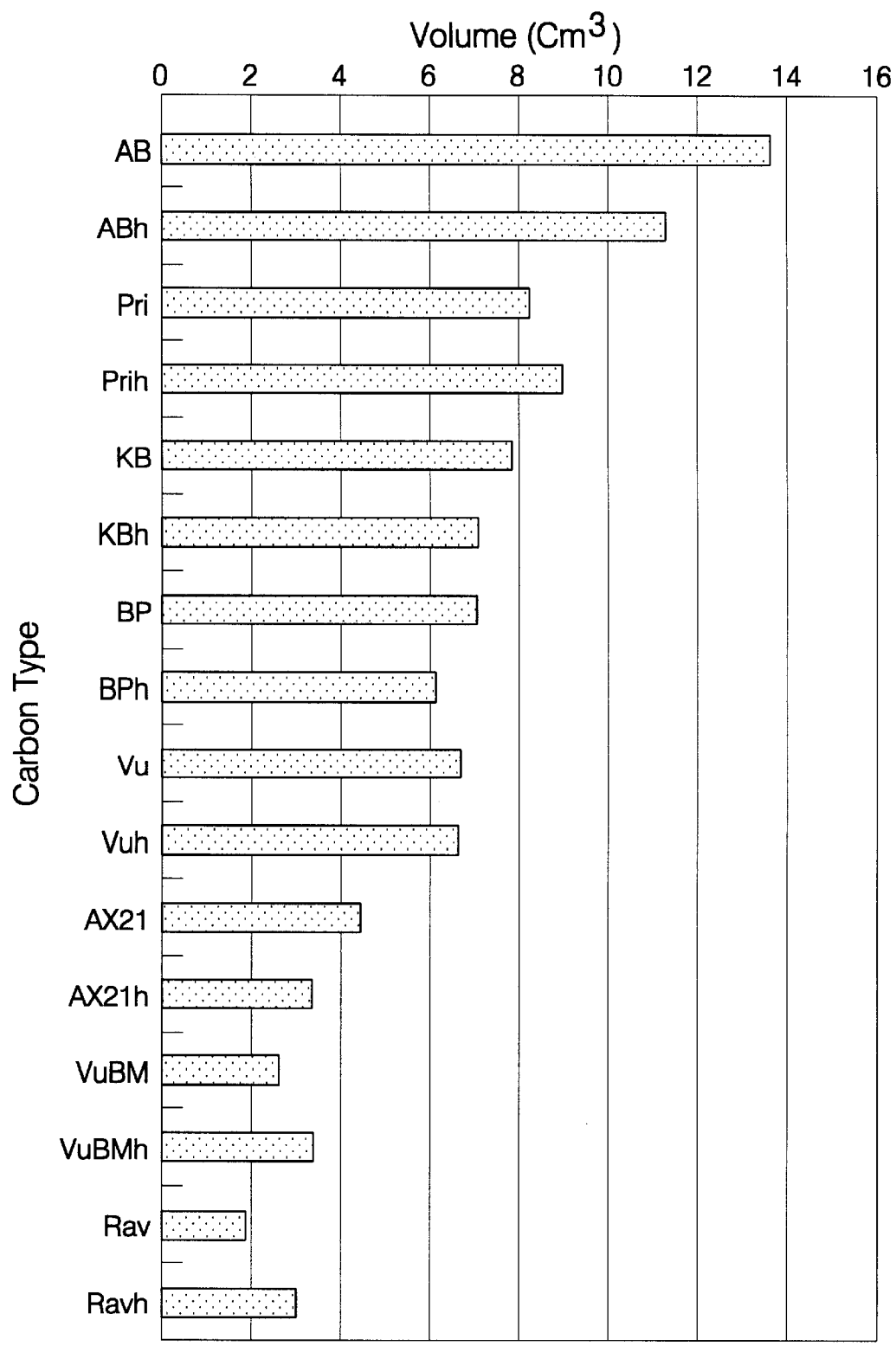
FIG. 9 shows the volume of 1 gram of 10 w/o carbon-supported Pt catalyst.

The optimum pore radius for the primary layer (first layer) may be similar to, and need not be different from the catalyst layer. However, the carbon volume per unit mass is thought to be important. AB has the lowest density and hence the highest volume per gram (FIG. 9). Thus, AB will ensure the mechanical blocking of pores in the carbon sheet without appreciably impeding gas transport through the pores in the primary layer. Based on this, it is preferred that these carbon particles are characterized by a volume per gram of at least about 10 $cm^3/gm$. This corresponds to a density of about 0.1 $gm/cm^3$ or less for the carbon particles of the primary layer.

Although catalysts may optionally be included in the primary layer (first layer) it is not necessary, since it is unlikely that the reaction zone would extend beyond the main or catalyst layer (second layer). However, the addition of trace amounts of catalysts (platinum) does improve the conductivity of the matrix and thus facilitates cell performance. Since an ultralow loading of 0.02 $mg/cm^2$ was sufficient to yield the benefit, an amount of this magnitude is adequate and there appears to be no useful purpose to increase the loading further. It is thought that a range on the order of zero up to 0.15 $mg/cm^2$ is adequate.

TABLE 1

Effect of Cathode Catalyst Layer Nafion Content on the Real Platinum Surface Area

| Nafion Loading (w/o) | Electrode Pt Loading (mg/cm$^2$) | Absolute Electrochemical Area (cm$^2$) | Normalized Real Area (m$^2$/gm) |
|---|---|---|---|
| 20 | 0.23 | 2026 | 35.23 |
| 25 | 0.21 | 2372 | 45.18 |
| 30 | 0.24 | 3330 | 55.50 |
| 35 | 0.21 | 3000 | 57.14 |
| 40 | 0.22 | 3370 | 61.27 |

TABLE 2

Physicochemical Properties of Carbon Blacks Used in Fuel Cell Testing

| Carbon Type | Source | Total BET AREA (m$^2$/g) | Micropore Area (m$^2$g) | Mesopore Area (m$^2$g) | Mesopore Area (%) | Avg. Pore Radius (AU) | Slurry pH |
|---|---|---|---|---|---|---|---|
| AX-21 (AX21) | Anderson Development | 2900.00 | 2832.00 | 68.00 | 2.34 | 9.90 | 4.80 |
| AX-21, heated (AX21h) | | 2652.80 | 2616.40 | 36.30 | 1.27 | 9.60 | 10.14 |
| Black Pearls 2000 (BP) | Cabot Corp. | 1506.00 | 1039.00 | 467.00 | 31.01 | 48.00 | 9.30 |
| Printex XE-2 (Pri) | | 969.00 | 270.10 | 698.90 | 72.13 | 72.10 | 8.00 |
| Ketjen Black (KB) | Akzo Chemical | 933.00 | 383.00 | 550.00 | 58.95 | 71.30 | 8.80 |
| Ketjen Black Heated (KBh) | | 919.90 | 376.70 | 543.10 | 59.04 | 70.80 | 9.96 |
| Raven 5000 (RAV) | Columbian | 481.00 | 145.00 | 336.00 | 69.85 | 28.90 | 2.30 |
| Raven 5000 Heated (Ravh) | | 479.90 | 194.70 | 285.20 | 59.43 | 50.20 | 9.49 |
| Vulcan Heated (Vuh) | | 239.50 | 135.80 | 103.70 | 43.30 | 79.30 | 9.90 |
| Vulcan XC-72R (Vu) | Cabot Corp. | 231.00 | 123.00 | 108.00 | 46.75 | 154.00 | 6.80 |
| Vulcan Ball Mill/2.5h (VuBM) | | 227.80 | 113.50 | 114.30 | 50.18 | 104.03 | 6.20 |
| Acetylene Black (AB) | Gulf Oil Chemical | 64.00 | 4.00 | 60.00 | 93.75 | 51.00 | 6.60 |

In summary, the present invention improves a vital component of the PEM fuel cell which includes the membrane-electrode assembly (MEA) comprising a membrane sandwiched between two carbon sheet current collectors carrying catalyst layers for the fuel cell reactions. The features described herein improve removal of product water and enhance the rate of oxygen transport to the reaction sites at the membrane/electrode interface. This is accomplished by careful optimization of the design and structure of the air electrode (cathode): the graphite paper density and its Teflon content; the Naf ion loading in the reaction layer; and the pore distribution and slurry pH of the carbon support used to disperse the catalysts. These features improve catalyst dispersion, gas transport to the catalyst layer, and water management.

Nafion in the electrode acts as a binder as well as the proton-conducting electrolyte in the catalyst layer. Carbon supports were investigated earlier for cells operated at room temperature and near atmospheric pressure. Ketjen Black at the cathode and ball milled Vulcan XC-72R at the anode were found to be the best carbon black supports for dispersing platinum catalyst and for optimum water management (U.S. Pat. Nos. 5,272,017 and 5,316,817).

Prior to the improvements described in U.S. Pat. Nos. 5,272,017 and 5,316,817, the method of making the membrane electrode assembly (MEA), involved coating the membrane with platinized carbon slurry and then attaching a carbon sheet as current collector to the membrane. This had the drawback of being suitable mainly for thick membranes with high equivalent weight such as Nafion 117. The method of U.S. Pat. Nos. 5,272,017 and 5,316,817 involves applying the catalyzed carbon slurry directly on the carbon sheet followed by hot pressing the electrodes to a membrane. The present approach uses a multilayered electrode structure that can be readily adapted for mass production and also for any type of proton exchange membrane or carbon sheet for the gas diffusion backing.

The multilayered cathode structure consisted of a primary carbon black layer with ultralow amounts of Pt (0.02 mg/cm$^2$) and a main primary catalyst layer of a suitably treated carbon black loaded with 20 w/o Pt. The primary layer improved the coatability of the main catalyst layer and helped improve the cell performance by localizing the layer closer to the membrane interface. The main catalyst layer performance was optimized with carbon supports that had adequate hydrophobicity to reject water from the electrode matrix, but sufficient hydrophobicity to disperse the Pt catalyst for high catalyst utilization. The loading of Nafion polymer in the main catalyst layer, and Teflon polymer in the carbon sheet current collector were also optimized for better gas distribution and catalyst utilization. Carbon sheets with densities in the range 0.3 to 0.35 g/cc and Teflon content less than 5 w/o were found to be optimum for the current collector. Cathode Nafion content of 30 to 35 w/o yielded acceptable Pt utilization while keeping electrode flooding to the minimum. Among the various carbon materials with a wide spectrum of properties that were evaluated as cathode catalyst support, carbons with average pore radii greater than 5 nm and a slurry pH in the neutral range 6–9 were found to be best suited for cathode applications.

Improved performance of the hydrogen/air cell demonstrated herein was achieved through various preparation and composition parameters such as the Nafion content of the cathode, the Teflon content and density of the carbon sheet, and the physico-chemical properties of carbon supports used to disperse the catalyst, were all optimized. The effectiveness was clearly demonstrated as per the test results set forth herein.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. An electrode structure comprising: a current collector sheet, a first electrode layer, and a second electrode layer; said first electrode layer being between said current collector sheet and said second electrode layer; said first layer comprising a first group of carbon particles and said second layer comprising a second group of carbon particles; said first layer being uncatalyzed or catalyzed with a first group of very finely divided catalytic particles; and said second layer being catalyzed with a second group of very finely divided catalytic particles; provided that the weight ratio of catalytic particles to carbon particles of the first layer is less than that of the second layer.

2. The electrode structure of claim 1 wherein each one of the carbon particle groups comprises a plurality of the carbon particles having internal and external surfaces defining a plethora of pores within and between the carbon particles, and said very finely divided catalytic particles supported on the internal and the external surfaces of the carbon particles.

3. The electrode structure of claim 1 wherein the first layer is uncatalyzed and the second layer comprises said second group of carbon particles having internal and external surfaces defining a plethora of pores within and between the carbon particles, said second group of very finely divided catalytic particles supported on the internal and the external surfaces of the carbon particles, and a proton conductive material intermingled with the carbon particles and the catalytic particles.

4. The electrode structure of claim 1 wherein said first group of carbon particles is characterized by a density of 0.1 grams per cubic centimeter or less.

5. The electrode structure of claim 1 wherein said second group of carbon particles is characterized by a pH which is in a range of about 6 to about 9.

6. The electrode structure of claim 1 wherein each one of the carbon particle groups is characterized by a pH which is in a range of about 6 to about 9.

7. The electrode structure of claim 1 wherein said second group of carbon particles is characterized by an average pore radius which is greater than 5 nanometers.

8. The electrode structure of claim 1 wherein each one of said layers further comprises a proton conductive material intermingled with the carbon particles and the catalytic particles.

9. The electrode structure of claim 1 wherein the catalytic particle loading of the second layer is less than about 0.30 mg per $cm^2$ of electrode surface area, and the catalytic loading of the first layer is less than that of the second layer.

10. The electrode structure of claim 1 wherein the second layer comprises said catalytic particles and said carbon particles in a weight ratio of about 20:80; and said proton conductive material constituting 30 to 35 percent by weight of said second layer, with said catalytic and carbon particles constituting the balance.

11. The electrode structure of claim 1 wherein said current collector comprises a carbon sheet impregnated with Teflon, and based on 100 parts by weight of combined carbon sheet and Teflon, the Teflon constitutes up to about 5 parts.

12. The electrode structure of claim 11 wherein before impregnation, the carbon sheet has a thickness of 8 to 12 mils and a density of about 0.3 to about 0.35 g/cc.

13. The electrode structure of claim 1 wherein the first and second groups of carbon particles are of the same type.

14. The electrode structure of claim 1 wherein the first and second group of carbon particles are distinguishable by one or more of pH, pore size, particle size, and BET surface area.

15. An electrode structure comprising a current collector sheet, a first electrode layer, and a second electrode layer, with said first electrode layer being between said current collector sheet and said second electrode layer, said first and second layers respectively comprising first and second groups of catalyzed carbon particles, said catalyzed carbon particles supporting very finely divided catalytic particles, where the weight ratio of catalytic particles to carbon particles of the first layer is less than that of the second layer.

16. A method of making an electrode structure comprising the steps of:

a. providing a current collector sheet;

b. forming a first layer on said sheet which comprises proton conductive material, a first group of carbon particles, and optionally catalytic particles;

c. forming a second layer over said first layer, where said second layer comprises proton conductive material, a second group of carbon particles, and catalytic particles, where the amount by weight of catalytic particles relative to carbon particles of the second layer is greater than that of the first layer.

17. The method of claim 16 wherein step (b) is conducted by forming a first mixture of proton conductive material, a first group of carbon particles, and a first group of finely divided catalytic particles supported on and in the carbon particles; and applying the first mixture onto the surface of the current collector and forming a first film from the mixture.

18. The method of claim 16 wherein step (b) is conducted by forming a first mixture of proton conductive material and a first group of carbon particles; and applying the first mixture onto the surface of the current collector and forming a first film from the mixture.

19. The electrode structure of claim 16 wherein said first group of carbon particles is characterized by a density of 0.1 grams per cubic centimeter or less.

20. The method of claim 16 wherein step (c) is conducted by forming a second mixture of proton conductive material, a second group of carbon particles and a second group of finely divided catalytic particles supported on and in the carbon particles and applying the second mixture onto the first layer.

* * * * *